Jan. 28, 1936.  C. F. DINLEY  2,028,759
TREATMENT WITH SOLVENTS
Filed Sept. 30, 1931  10 Sheets-Sheet 1

FIG. 1

WITNESSES

INVENTOR:
Clarence F. Dinley,
ATTORNEYS.

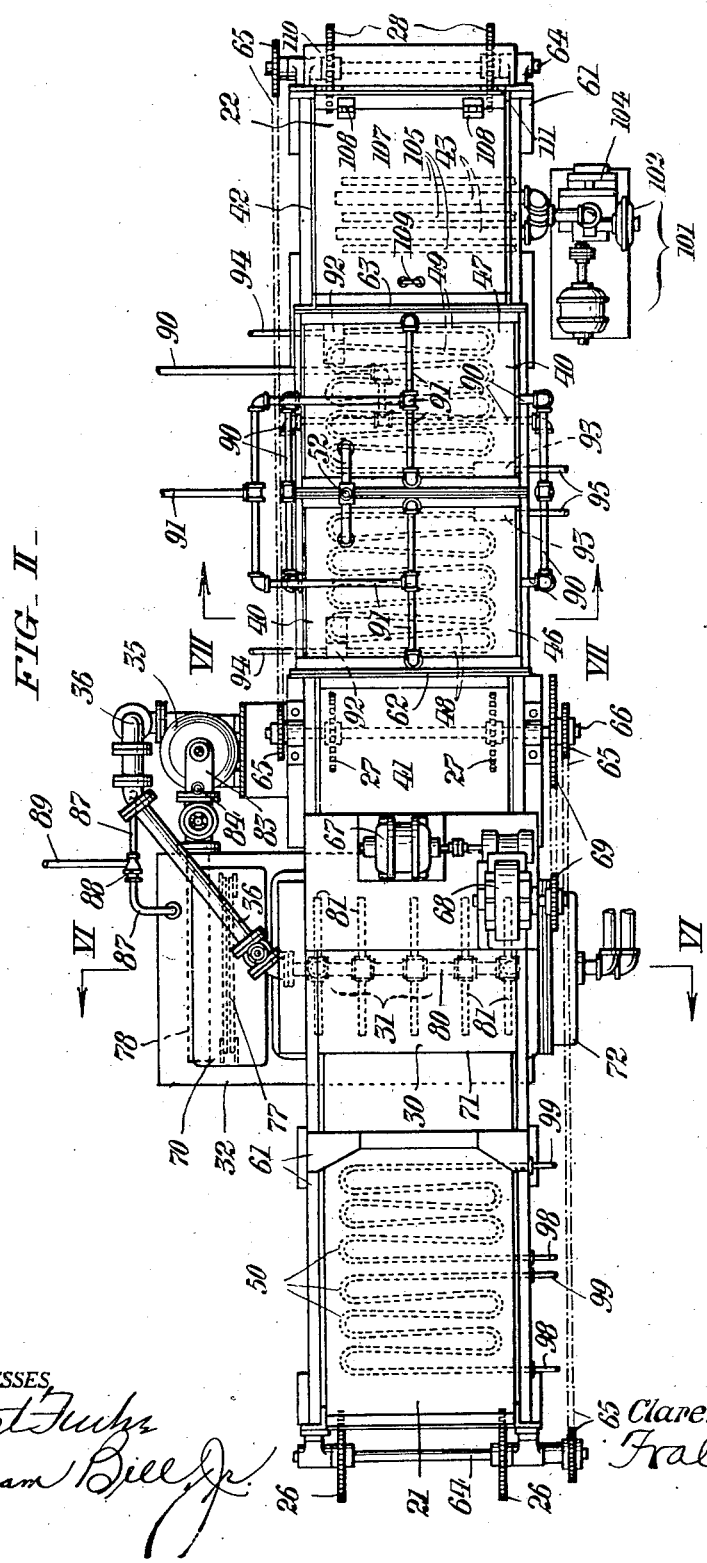

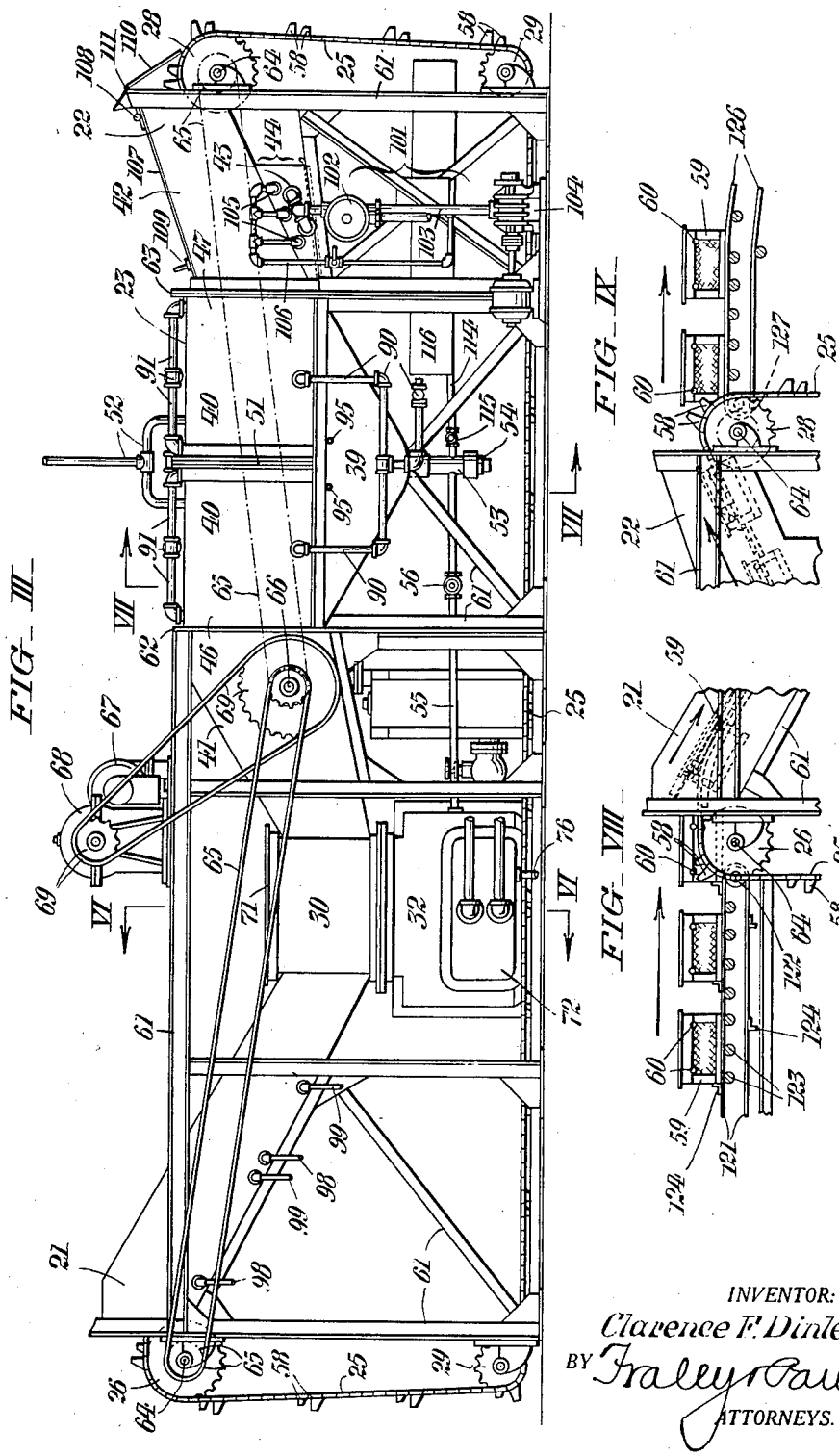

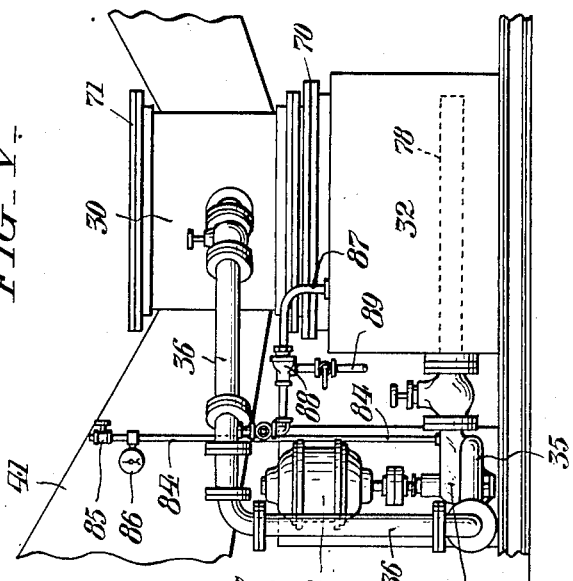
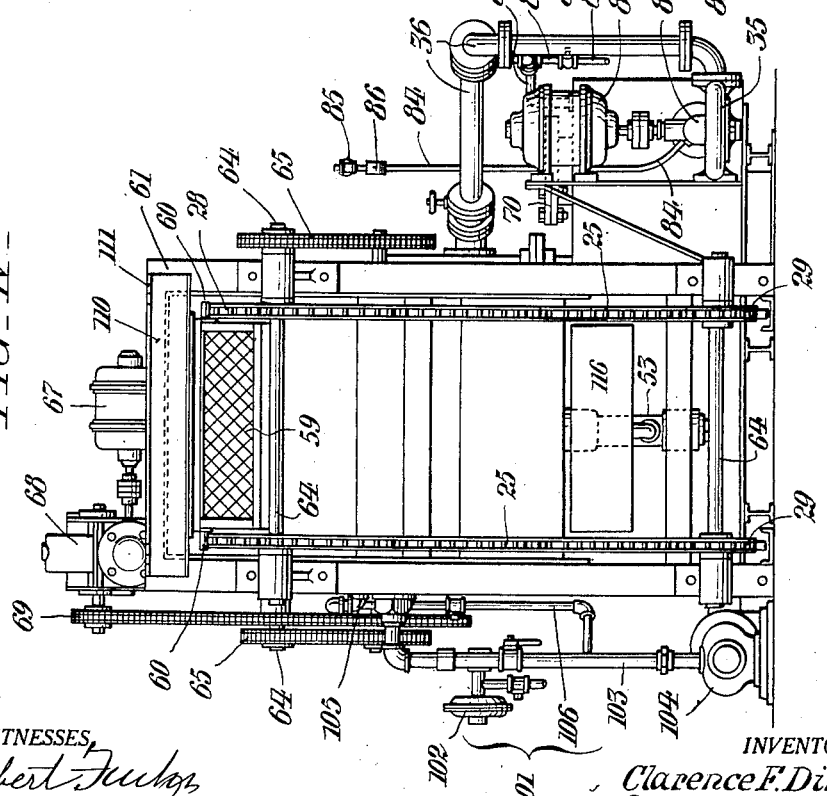

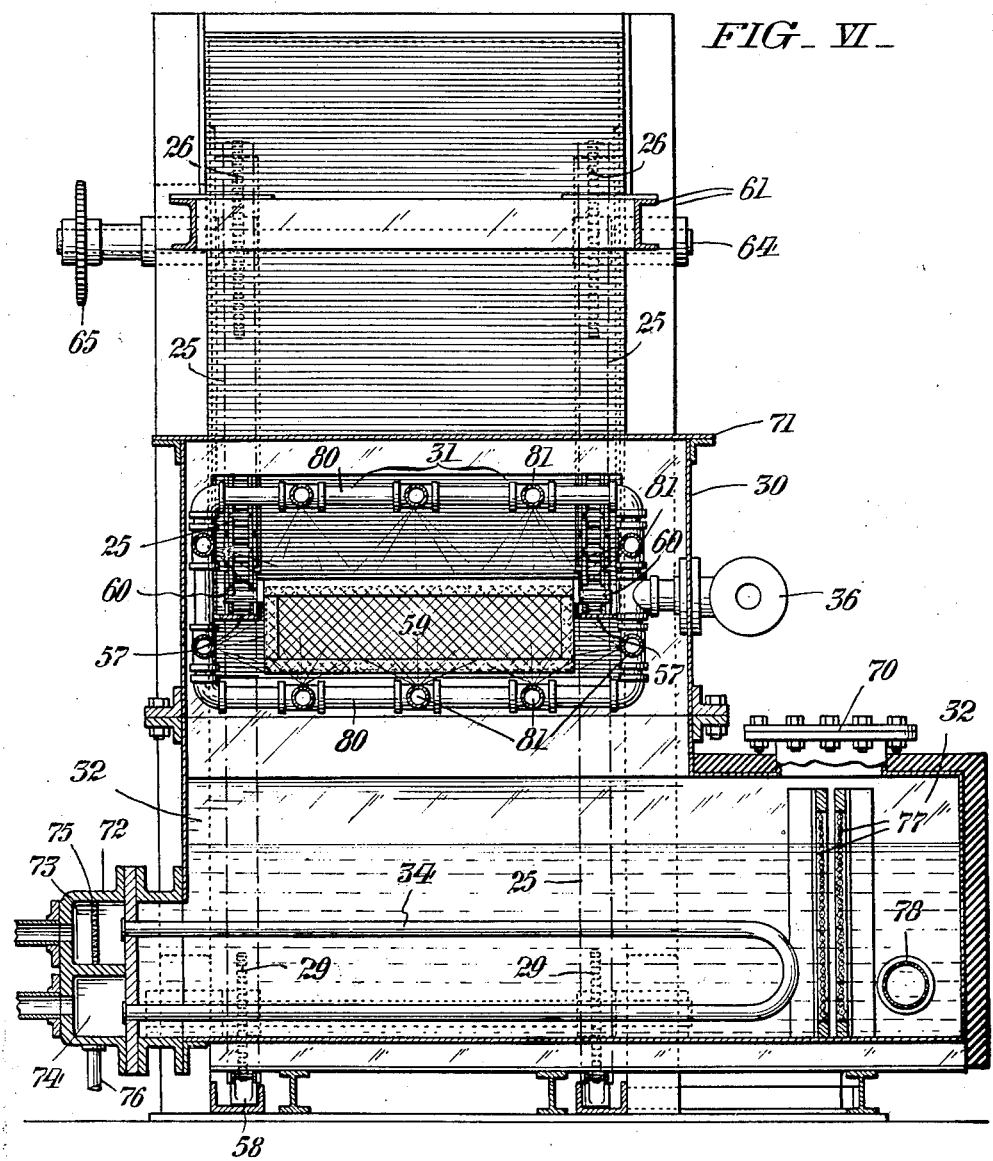
FIG. VI

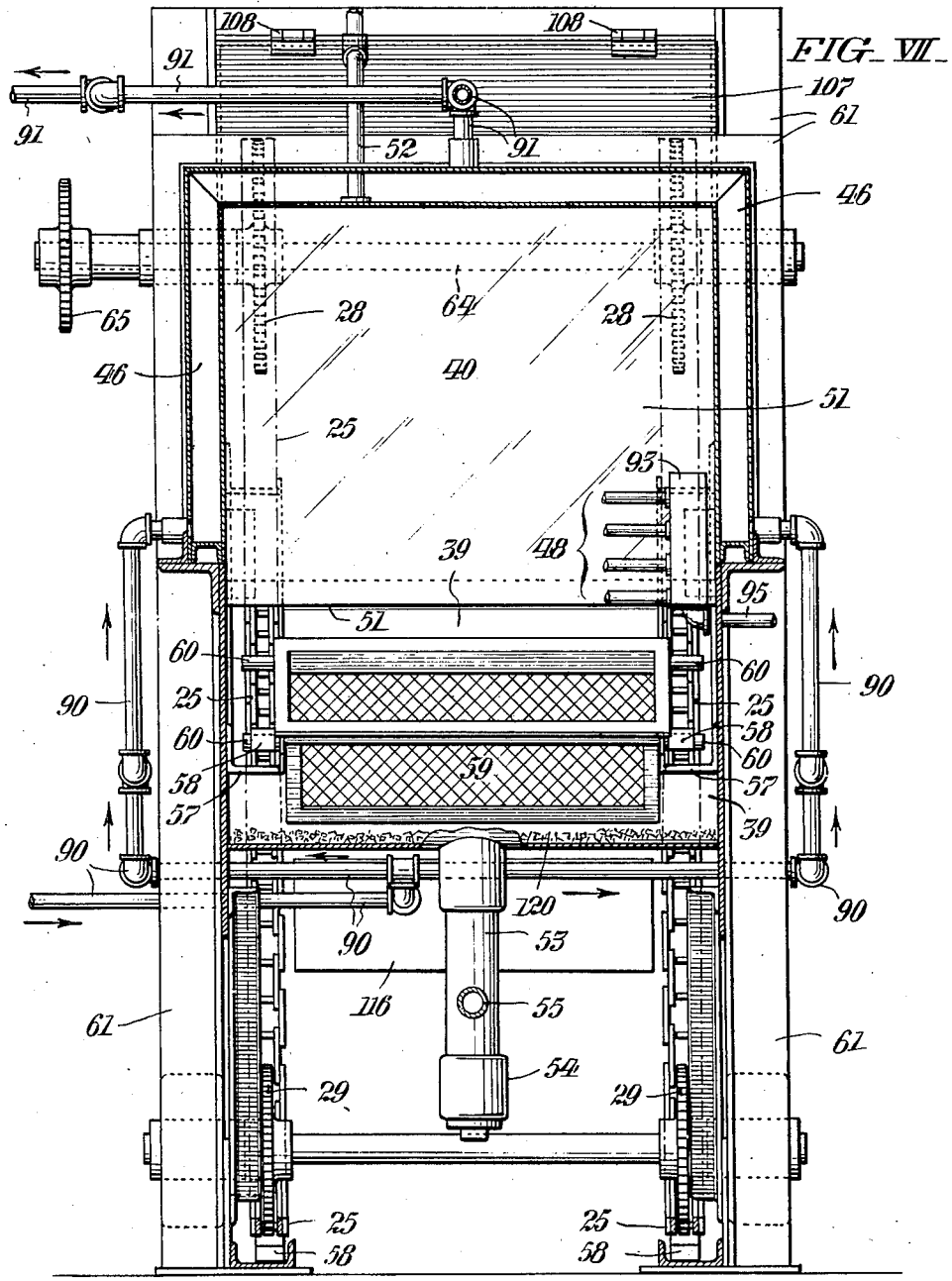

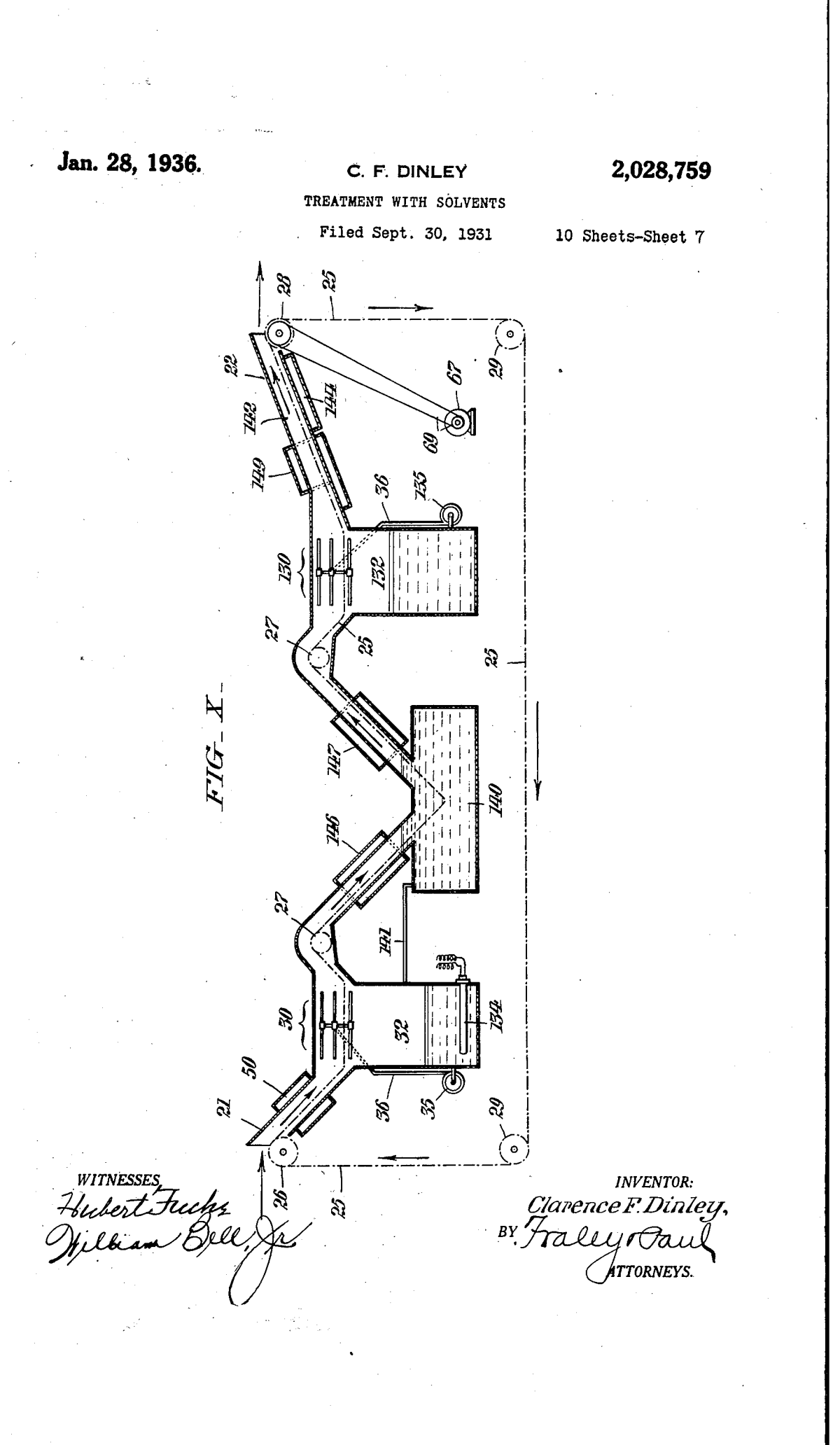

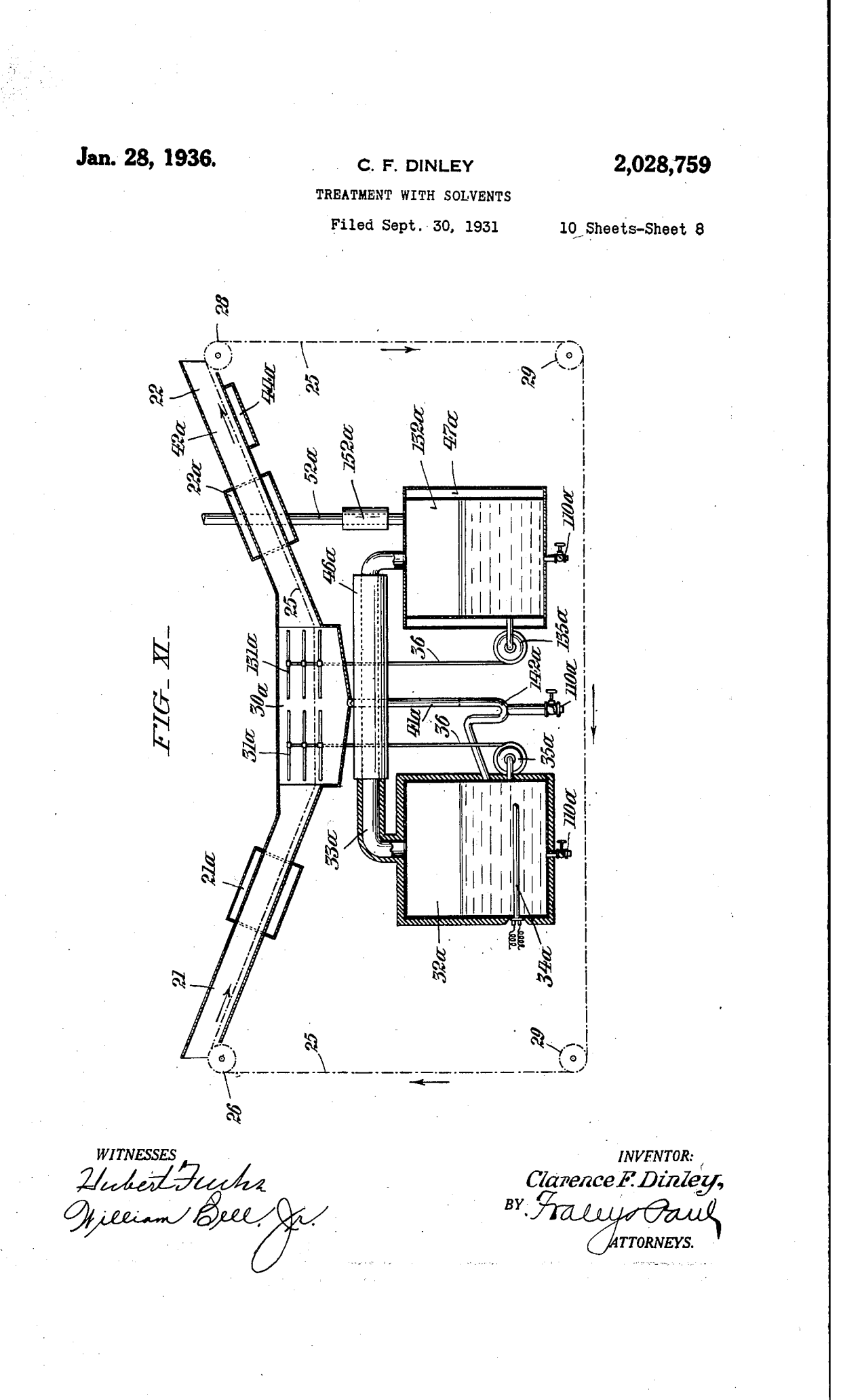

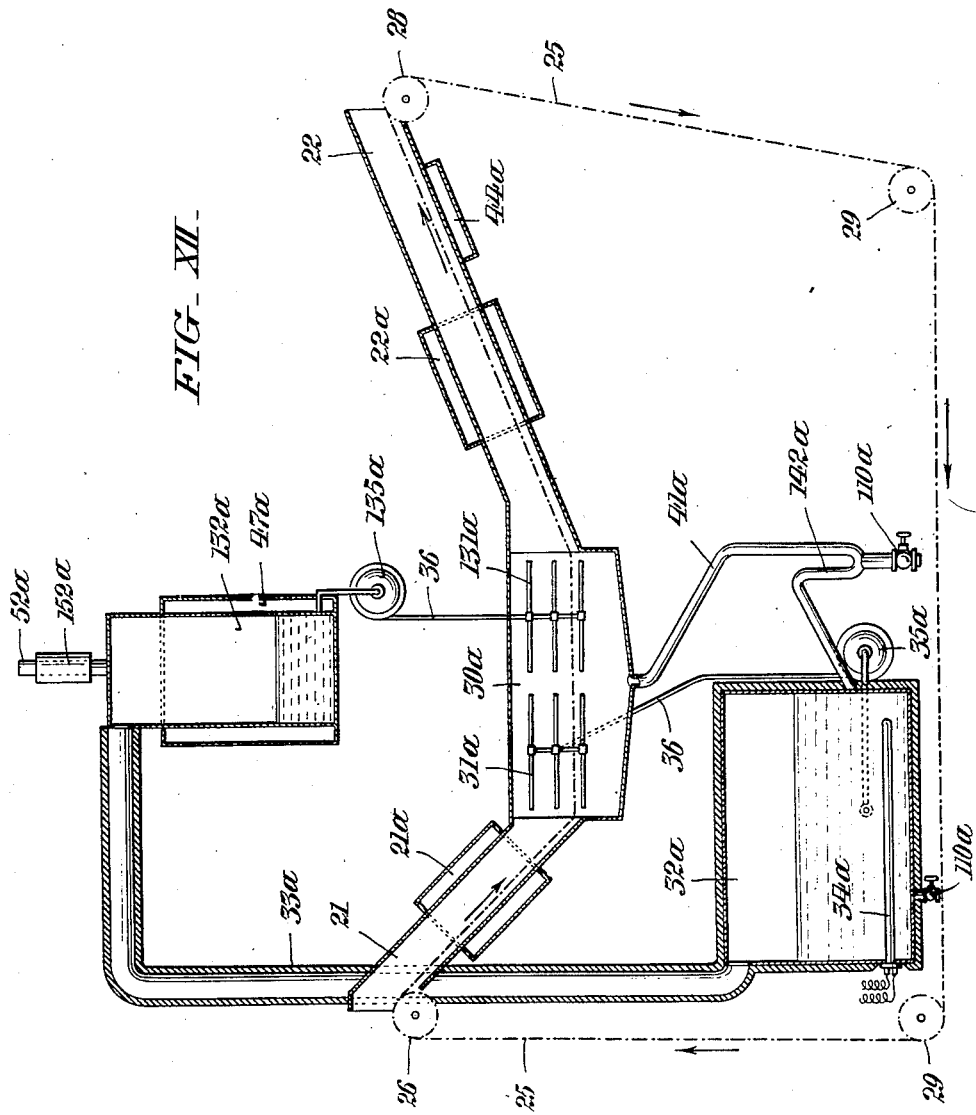

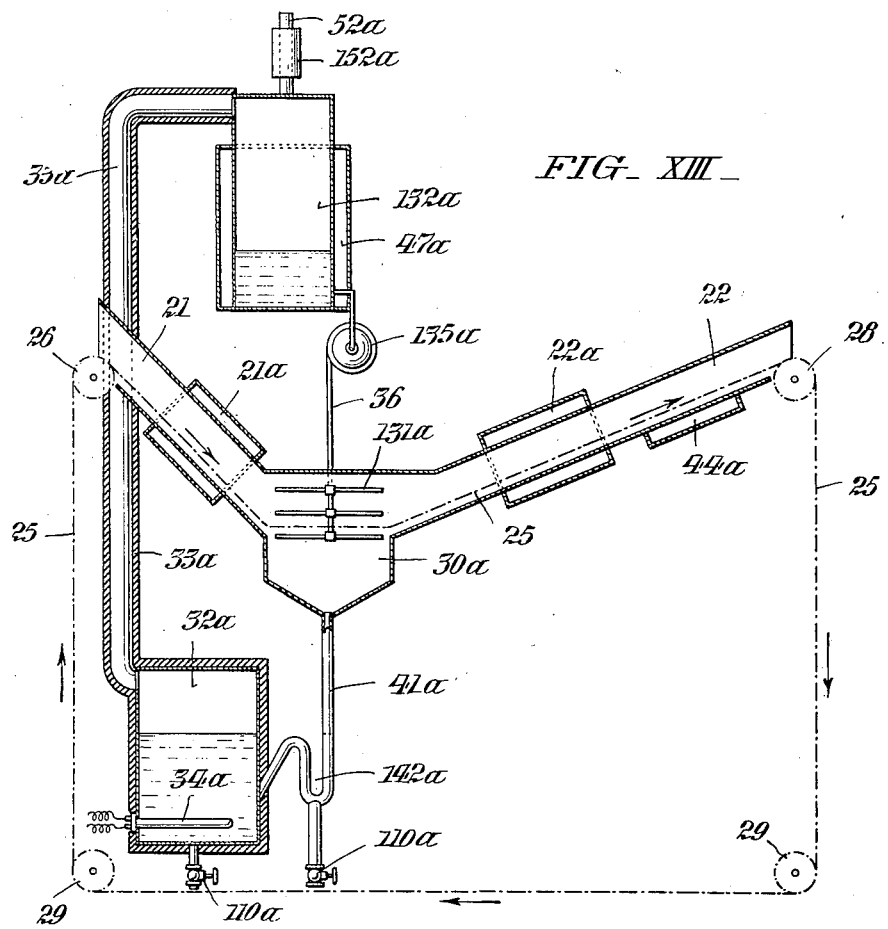

Patented Jan. 28, 1936

2,028,759

UNITED STATES PATENT OFFICE 2,028,759

TREATMENT WITH SOLVENTS

Clarence F. Dinley, Detroit, Mich., assignor to James H. Bell, Philadelphia, Pa.

Application September 30, 1931, Serial No. 566,093

20 Claims. (Cl. 87—6)

My invention relates to treatment with solvents for such purposes as cleaning and degreasing, etc., and particularly to the use of volatile solvents. An apparatus for this purpose is set forth in U. S. Patent No. 1,771,698, granted July 29, 1930, to George Wolff as inventor, wherein the use of volatile solvents whose vapors are heavier than air is described, such as benzine, benzol, and particularly chlorinated solvents like carbon tetrachloride and trichlorethylene, whose vapors are entirely uninflammable. It is an object of my invention to improve the use of such solvents, making it more rapid and effective, convenient and economical, and minimizing losses of the solvent as far as possible. I also aim to increase their range of application and usefulness, and to adapt them to continuous large scale operation. How these and other advantages can be realized through the invention will appear from my description hereinafter of preferred forms of embodiment, with particular reference to their use for cleaning metal and other parts and objects.

In the drawings, Fig. I is a somewhat diagrammatic general view, showing a vertical longitudinal section through the apparatus.

Fig. II is a general plan view of the apparatus.

Fig. III is a side elevation of the apparatus from the front of Fig. II.

Fig. IV is an end view of the exit end of the apparatus, from the right of Figs. I-III.

Fig. V is a fragmentary side elevation from the rear of Fig. II.

Fig. VI is a view from the right of Figs. I-III, showing the apparatus in cross-section as indicated by the line and arrows VI—VI in Figs. I-III.

Fig. VII is a view from the left of Figs. I-III, showing the apparatus in cross-section as indicated by the line and arrows VII—VII in Figs. I-III.

Fig. VIII is a fragmentary side view illustrating an arrangement for automatically feeding and delivering supports or containers charged with things to be treated to a conveyor for carrying them through the treating apparatus.

Fig. IX is a similar view illustrating an arrangement for automatically receiving the containers from the treating conveyor and carrying them away.

Figs. X, XI, XII and XIII are diagrammatic general views similar to Fig. I, but illustrating somewhat different forms of apparatus.

Referring to the drawings, and more particularly to Figs. I and II, the apparatus is shown (in vertical longitudinal section) as an enclosure or shell closed to exclude air and retain the treating medium, but open for the more convenient introduction and removal of things to be treated. For this purpose, the vessel has more or less restricted inlet and outlet openings or passages 21, 22 extending substantially to or above its highest interior point or condensing area at 23. For passing the things or "work" to be treated through the apparatus, there is shown a conveyor system, consisting of a pair of sprocket chains 25. They extend over pairs of driving sprockets 26, 27, 28, and return outside and beneath the apparatus, around pairs of idle guide sprockets 29. During their passage through the apparatus, the things carried by the conveyor 25 may be treated with solvent (e. g., trichlorethylene, etc.), in both liquid and vapor phases. In the present instance, provision is made for successive treatment of things in separate treating spaces or chambers in the apparatus, as will presently appear.

Still referring to Fig. I, it will be seen that the apparatus affords a spraying space or chamber 30 wherein a spray device 31 is arranged to act on the things to be treated as they are carried through by the conveyor 25 (see also Figs. II and VI). As the things come in from the inlet or entrance 21, hot solvent thus forcibly sprayed on them dissolves or forcibly washes off all grease or dirt, and gravitates to a (thermoinsulated) pocket or receptacle 32 in the bottom of the apparatus, and of the chamber 30. Means are provided for heating the body of liquid solvent at 32, such as a bank of steam-pipes or U-tubes 34 submerged in the liquid. A pump 35 is shown for circulating the solvent from the receptacle 32 to the spraying device 31, through (valved) piping 36. The hot solvent vaporizes freely, both from the spray and from the surface of the pool at 32, and its vapor fills the apparatus more or less completely.

The apparatus also affords a liquid solvent bath or pool in a pocket or receptacle 39 at the bottom of a treating space or chamber 40, through which the things to be treated are carried by the conveyor 25, and where they are completely submerged in the liquid solvent. The chamber 40 and body of solvent at 39 are protected from contamination from the body of solvent at 30 by such arrangement or separation as obviates falling or draining of the sprayed solvent into the pool 39: i. e., in the present instance, they are too remote from 30 for direct spray-fall contamination, and the intervening bottom conformation of the connecting passage extension 41.

of the chamber 40 precludes drainage from 30 to 39. On the contrary, the pool 39 stands higher than the receptacle 32, and drains into the latter. During the travel of the things treated from 30 to 40, the somewhat greasy solvent clinging to them as they leave the spray drains and drips off, and runs back into the receptacle 32. Any such greasy solvent still remaining on the things is rinsed off in the pool at 39, so that the things emerge from the latter thoroughly clean.

Emerging from the pool 39 and travelling on to the outlet or exit 22, the things treated traverse a zone of heat at 42, produced by transverse burners 43 in an oven 44 beneath the outlet passage wall. Part of the solvent clinging to the things as they emerge from the pool 39 drains and drips off and runs back into the pool; the rest is driven off as vapor by the heat at 42. Thus the things treated leave the apparatus clean and dry, and do not carry off any of the solvent. As shown in Fig. I, the zone of heat at 42 is sufficiently removed from the condensers 47, 49, so as not to heat them materially by radiation. It is even more effectually removed from radiant proximity to the condensers 46 and 48 by the greater distance and the interposition of the baffle 51, hereinafter referred to.

As already stated, the solvent is vaporized in the spraying space at 30 (from the spray at 31 and the surface of the pool at 32) and in the drying zone at 42, so that its vapor substantially fills the interior of the apparatus, up to the highest interior point or level at 23. However, the vapor is not allowed to accumulate to the point of filling the passages 21, 22 and overflowing from them, but is condensed as rapidly as it is evolved, and thus kept from rising to the level of the entrance and exit openings. The principal condensing space is intermediately located, at the top of the chamber 40 in the interior of the apparatus,—so that vapor is drawn inward toward it from both 21 and 22,—and preferably between the two sources of vapor at 30 and 42. The condensate is caused or allowed (in the main) to drain into the pool at 39, thus supplying and replenishing the latter with purified solvent and maintaining it continually full, and overflowing back into the receptacle 32. The condensing means shown consist of water-jacket sections or units 46, 47 on the top and sides of the space or chamber 40 (down to the liquid level at 39) and water-tube sections or units 48, 49 exposed in the interior of the apparatus directly over the pool at 39.

Additional condensing means 50 may be provided for the inlet or entrance 21; here shown as consisting of water-tubes on the sloping lower wall of the passage 21, to insure against escape of vapor from the spraying space 30, especially under unusual conditions of rapid vaporization, as when the hot spray 31 is first started up. In practice, any or all of the condensing units 46, 47, 48, 49, 50 may be employed, as found needful.

As shown in Fig. I, the passage through the apparatus is adapted to be occluded and sealed by liquid against free passage of solvent vapor, which might otherwise be carried out into the air by drafts clear through the apparatus, from entrance 21 to exit 22, or vice-versa. The extension of the upper wall of the apparatus into the liquid for this purpose consists of a transverse baffle 51 located between the condensing sections 46, 48 and 47, 49, in the midst of the chamber or space 40, and dipping into the body of solvent at 39. In other words, baffle 51 cooperates with receptacle 39 to form a liquid solvent trap in which the pool depth or surface level is determined by the overflow at the left-hand edge of the receptacle. The partition 51 also divides the chamber 40 (or its upper part above the liquid level at 39) into separate chambers 45 and 45a, which are provided with the condensing means 46, 48 and 47, 49, respectively. While the right-hand chamber 45a opens into the upward-extending exit passage 42 at its highest interior point or level 23, the left-hand chamber 45 is closed not only at its highest interior point 23, but downward to the level where its passage extension 41 opens into chamber 30, a substantial distance below the top 23. Thus the internal, inner chamber 45 not only retains solvent vapor, but also entraps and retains in its upper portion such air as finds its way into the chamber,—the solvent vapor being heavier than the air.

From the top of the apparatus at 23, an air vent pipe 52 extends to ample vapor-sealing height (such as a couple of feet from the top 23), to relieve the condensing space of chamber 40 of the air that might otherwise be trapped there and render the condensers 46, 47, 48, 49 air-bound. As shown, this vent pipe 52 has branches connected at both sides of the baffle 51. Without such a means of venting the chamber 45 to the left of baffle 51 of air while preventing the escape of vapor, it would be necessary to lower the liquid solvent level at 39 below the baffle 51 every time the apparatus was temporarily shut down, to allow the air to escape therebeneath to the outlet 22 when the apparatus was started up again; and even then it might be difficult to rid the condensing space of chamber 45 to the left of baffle 51 completely of air.

As shown in Figs. I and VII, the receptacle 39 has a drainage well 53 at its bottom, with a drain plug 54. From the well 53, there is a pipe connection 55 to the tank 32, with a valve 56 therein. This affords a means of drawing down the liquid level at 39 or even draining away the solvent and abolishing the pool 39,—as hereinafter described.

Between successive sprockets 26, 27, 28, the conveyor chains 25 may rest on track-ledges 57 at the sides of the enclosure. The two chains 25, 25 may be provided with upstanding notched ears or lugs 58 at suitable intervals, to engage supporting means or containers spanned between the chains and thus assure proper spacing of successive things (or batches thereof) to be treated. In the present instance, such supporting means or containers are shown as foraminous metal baskets or trays 59, each having a pair of laterally projecting lugs 60, 60 on its sides to engage the ears 58 and rest on the chain 25 in the intervals between the ears. The basket supports 59 do not, therefore, hang free between the chains 25, 25, but follow the varying flight or slope of the chains, which facilitates drainage of the treated things in the trays,—especially between the spray at 30 and the space 40.

It will be seen that the apparatus shown in Fig. I has the general character of a horizontally extending passage or tunnel, enlarged somewhat to form the chambers 30 and 40, with bottom pockets 32, 39 at its low points for holding or retaining the bodies of solvent,—and with some slope between,—and with entrance and exit ends 21, 22 rising on a slope above the highest interior point or level at 23. While this horizontal extension covers considerable floor space, the moderate conveyor slopes above described are more favorable for drainage of the articles treated than would be an abrupt up and down travel that required the supports 59 to hang always vertical. The liquid seal at 51 greatly reduces the height to which the passages 21, 22 need extend in order to be effective in preventing the escape of vapor under all conditions. Without the liquid seal at 51, the entrance and exit passages 21, 22 might need to be carried to more than an ordinary vapor-sealing height;—e. g., several feet above the high point of the apparatus at 23,— to take care of drafts, and of vapor surges whenever the spray at 31 is started up. As regards the entrance 21, the condenser 50 is also helpful in these respects.

It will also be seen that the condensing means 46, 47, 48, 49 perform a dual function: i. e., they prevent overflow and loss of solvent vapor at 21 and 22; and they also supply (purified) treating and sealing liquid for the chamber or space 40 and the pool 39.

As the heat of things or articles passed through the pool at 39 may tend to vaporize solvent therefrom (as well as the heat of the drying zone 42), the condensers 46, 48 may be regarded as functionally intermediate the two bodies of solvent at 30 and 40, and the condensers 47, 49 as intermediate the body of solvent at 40 and the drying zone 42 and exit 22: i. e., each set of condensers condenses vapor from the two sources indicated. Speaking with reference to the exit 22, the vapor is condensed both inside and outside the seal at 39. Being over the pool 39, the condensers 46, 47, 48, 49 produce a drip or rain of pure solvent on the things treated as they enter and leave the pool.

It will be understood, of course, that various treatments may be carried out in an apparatus of this general character, and that the treatment and the provisions therefor may be varied, simplified, or elaborated: e. g., the number of bodies of solvent, sprays, and pools might be reduced or increased.

For example, in the apparatus of Figs. I–VIII, the valve 56 in the pipe 55 (hereinafter more fully described) might be left open, so as to drain the solvent back into the tank 32 as fast as it is condensed and abolish the pool at 39. Then chamber 40 and its connection 41 to the chamber 30 may be regarded as part of the outlet passage 22 from the chamber 30,—in which passage the things are treated with vaporous solvent and with a secondary spray or rain of pure solvent dripping from the condensing means, if any of the condensers 46, 47, 48, 49 are used. Or, again, the spray 31 may be shut off, while the valve 56 remains closed and the pool at 39 is kept full. In this case, the chamber 30 and its connection to the chamber 40 may be regarded as part of the inlet passage 21 to the chamber 40,—in which passage things are treated with vaporous solvent merely.

While the general arrangement and operation of the apparatus of Figs. I–VII has been fully described, explanation of its construction and operation in greater detail may be useful.

The shell of the apparatus is of sheet metal, and (Fig. III) has a structural framework 61 of commercial sections such as angles, channels, etc. The structure (both shell and frame) is divided into sections at 62, 63, which are detachably secured together with interposed fluid-tight packing. The shafts of the several pairs of sprockets 26, 27, 28, 29 are mounted in bearings attached to the frame 61. The shafts 64, 64 for the end sprockets 26 and 28 are driven by chain and sprocket connections 65 from the shaft 66 for the intermediate sprockets 27, and this shaft 66 is driven by an (electric) motor 67 mounted on top of the frame 61, through reduction gearing 68 and a chain and sprocket connection 69. As shown in Fig. I, guides 69a project from the sides of the apparatus over the sprockets 26, 27 and the downward flights of the chains 25, to prevent the lugs 60 from lifting out of the notched lugs 58 as the trays 59 pass over the sprockets 26, 27, and to prevent the chains 25 from buckling upward.

In Figs. I–VI, the chamber 30 proper is shown as a rectangular chamber slightly larger than the adjacent portions of the passage through the apparatus, and the subjacent pocket or receptacle 32 as a rectangular tank somewhat wider and longer than the chamber 30, and projecting rearward therefrom,—Fig. II. The tank 32 is detachably secured to the chamber 30, and its rearward extension has an opening having a detachable cover 70. The chamber 30 has a detachable top or cover 71. The heating U-tubes 34 (Fig. VI) are connected to the header 72 detachably secured over an opening in the front of the tank 32, and having horizontal inlet and outlet chambers 73, 74, the former of which has a perforated diffusing plate 75, and the latter a drainage connection 76 for water of condensation. A double wire gauze strainer 77 is detachably mounted across the rear of the tank 32, between the heating unit 34 and the perforated suction portion 78 of the pipe 36, which extends clear across the rear end of the tank.

As shown in Figs. I, II, and VI, the spray device 31 comprises a rectangular manifold pipe 80 connected to the circulating pipe 36 and surrounding the things to be treated as they are carried along by the conveyor 25, preferably in the foraminous trays 59. Longitudinal spray pipes 81 project both ways from the manifold 80, above, below, and at both sides of the trays 59, so as to jet the hot solvent on things in the trays from all sides: i. e., the pipes 81 are perforated on their sides toward the trays.

As shown in Figs. I, II, IV, and V, the solvent circulating pump 35 is a centrifugal pump arranged with its axis upright, and driven by a superjacent (electric) motor 82. The pump intake 83 is at the upper side of its impeller chamber, so that it receives the liquid solvent from above, by gravity flow from the tank 32. From a point in the intake 83 (preferably as close to its axial opening into the impeller chamber as possible), a pipe 84 extends upward a couple of feet, say, above the highest point of the circulating system (the top of the manifold 80); it has a control and regulating valve 85, and a vacuum and pressure gage 86 is connected to it below said valve. The function of this pipe 84, etc., will be presently explained. As a convenient means of replenishing the supply of solvent in the apparatus from time to time, even during operation, there is a (valved) by-pass connection 87 from the pipes 36 at the delivery side of the pump 35 to the tank 32 (at its suction side), with an injector 88 therein whose (valved) suction connection 89 may draw from a barrel or any other source of supply of the solvent.

When the apparatus is in operation, the liquid solvent circulated by the pump 35 becomes heated to a temperature approaching or approximating its boiling point,—which for trichlorethylene is about 180 degrees F. At such temperatures, the pump 35 tends to become vapor bound and circulate the liquid very irregularly or not at all,— the impeller simply revolving in the vapor-filled pump chamber without passing any liquid to speak of. This condition, as I have found, is due to the inability to secure sufficiently rapid inflow of liquid solvent at 83, which results in a lowering of the intake pressure at 83 below atmospheric. This produces a corresponding reduction in the boiling point of the solvent, to or below its temperature in the intake 83. The condition can be overcome by running the pump 35 somewhat slower (with correspondingly reduced solvent circulation), or by admitting just enough air (or any other suitable fluid) through pipe 84 to raise the negative pressure at 83 to atmospheric—or above the point at which the solvent will boil at its temperature at the time. The gage 86 affords a convenient means of determining, from experience and the properties of the solvent used, when the danger point is approached, and just how to adjust the valve 85 to let in the necessary amount of air. The slight amount of air required does not seriously reduce the amount of fluid pumped, since it does not interfere with the gravity flow of solvent to the pump, but only reduces or destroys the negative pressure or suction. As pumps and their driving motors are generally built to run at constant speed, the advantage of thus controlling and regulating the intake pressure is a very practical one.

As shown in Figs. II, III, and VII, cooling fluid (water) may be supplied to the lower ends of both condensing jackets 46, 47 in parallel, through suitably branching pipe connections 90, and carried off from the mid region of their top portions in parallel through suitably confluent connections 91. Each of the condensing units 48, 49 consists of a plurality of serpentine tubes connected in parallel between angular inlet headers 92 at the rear (Figs. I and II) and upright outlet headers 93 at the front. The cooling fluid (water) is supplied to the headers 92 in parallel through pipes 94, and led off from the headers 93 in parallel through pipes 95. As shown in Figs. I, II and III, the condensing means 50 consists of a couple of serpentine tubes lying on the bottom of the entrance passage 21: cooling fluid (water) is supplied to them in parallel through pipes 98, and led away in parallel through pipes 99.

As shown in Figs. I and III, the oven 44 is a sheet metal enclosure beneath the (unbroken) bottom wall of the exit passage 22, with a sliding bottom wall 100 removable to afford access to the burners 43. Gas for fuel is supplied the burners 43 from the supply system 101 through an automatic regulator 102, mixed with air supplied said regulator 102 through a pipe 103 from any suitable source, such as an (electric) motor driven compressor 104. Air for combustion (and cooling) is also supplied the oven 44 through perforated tubes 105 which are connected by a (valved) pipe 106 to the compressed air supply pipe 103, between the compressor 104 and the regulator 102. As shown in Fig. I, the air tubes 105 are arranged between the burners 43 and the wall of the apparatus, one between the burners and the others flanking the latter. The holes in these tubes 105 are arranged to jet the air toward the burners. The top wall of the exit passage 22 may have a movable section 107, hinged at 108 and provided with a handle 109, so that it can be opened when desired. As shown in Figs. I, III, IV, there is a door or cover 110 for the outlet opening 22, pivoted at 111 above the opening, to exclude the air when the conveyor 25 is not in operation.

From the drainage well 53 of the receptacle 39 there is also a pipe connection 114 with a valve 115 to a shallow tank 116. The combined capacity of vat 39 and tank 116 is sufficient to hold the whole supply of solvent in the apparatus, so that by opening the valve 115 while the valve 56 remains closed, the whole supply of solvent can be purified and collected, and the tank 32 then cleaned out. When this has been done, the valve 56 can be opened and the solvent drained back into the tank 32,—whereupon the valve 115 will of course be closed. This is possible because the tank 114 is altogether above the bottom of the receptacle 39 but below the normal liquid level therein.

Inasmuch as commercial chlorinated solvents generally contain hydrochloric acid or other forms of available, reactive chlorine, and also react with water and with the moisture of the air to form hydrochloric acid, it may be found advisable to place and maintain crushed or broken limestone or marble 120 at the bottom of the tank 32 and of the receptacle 39 to neutralize such acid. This not only obviates corrosion of the apparatus or of metal things treated in it, but also prevents injurious fumes from being given off, which might otherwise endanger those using the apparatus, and even render its vicinity quite uninhabitable. Also, volatile stabilizing agents which are readily chlorinated may be added to the chlorinated solvent in amounts of ¼ of 1% up to 1%, by weight,—such as anthracene, quinine, or camphor,—to react with hydrochloric acid in the vapor phase as it is formed by contact of the solvent with the moisture of the atmosphere.

I do not here specially claim these modes of purifying and stabilizing the solvent and preventing corrosive action or spotting, inasmuch as the same forms the subject of my application Serial No. 566,176, filed concurrently with this application.

Figs. VIII and IX show arrangements for automatically feeding the charged baskets or trays 59 of things to be treated to and from the conveyor 25.

Fig. VIII shows a conveyor belt 121 extending around a suitably driven roll 122 located between the sprockets 26, and supported on idle anti-friction rolls 123. The belt 121 may be provided with cleats 124 for engaging the trays 59. The return run of the belt 122 extends over supports 125. The cleats 124 may be located at intervals corresponding to those of the notched chain-ears 58. As the trays 59 pass over the roll 122, their front lugs 60 engage and rest on the sprocket chains 25. Their rear lugs 60 engage in the notches of the next pair of chain-ears 58 as the latter come up around the sprockets 26.

Fig. IX shows a like arrangement of uncleated conveyor belt 126 that receives the trays 59 as they come from the conveyor chains 25 and carries them away. In passing to the belt 126 where it comes around the roll 127, the trays 59 rest on the sprocket shaft 64.

Fig. X is a diagrammatic general view, similar to Fig. I, illustrating an apparatus which includes most or all the essential features of Fig. I, but in somewhat different forms, and in addition has an extra spray interposed between the washing and sealing pool and the drying zone.

Here the things treated pass first through the hot spray at 30, over a tank 32; then through a cold bath or pool of the liquid solvent in a chamber 140, which washes off any greasy solvent from the spray at 30, and also affords a liquid seal against drafts through the apparatus; then through a cold spray of extremely pure solvent at 130; over a tank 132; and finally through a drying zone at 142, heated by an oven 144 below the outlet passage 22. Electric heating means 134 in the bottom of the tank 32 serves to heat (and vaporize) the solvent. As in Fig. I, the vapor is condensed between the spray 30 and the solvent pool at 140, as by a cooling jacket 146 around the connecting passage, and the condensate drains into the pool 140. Provision is also made for condensing vapor between the pool 140 and the spray at 130, as by a cooling jacket 147 around this connecting passage,—the condensate also draining back into the pool 140. Vapor may also be condensed between the spray 130 and the outlet 22, as by a cooling jacket 149 around the outlet passage, between the spray 130 and the drying zone 142. Pumps 35 and 135 serve to circulate the liquid solvent from the tanks 32 and 132 to the sprays at 30 and 130, and there is a liquid solvent overflow connection 141 from the tank 140 back to the body of solvent in tank 32, at such height as always to maintain the liquid seal at 140. Here the arrangement of the tanks 32, 140, 132, condensers 146, 147, 149, and overflow 141 prevents contamination of the purer solvent by the less pure solvent, maintains the proper supplies of treating medium in the various parts of the apparatus, and prevents vapor losses. There is practically no liquid or vapor interchange between the bodies of liquid at 140 and 132: indeed the solvent at 130 might even be a different kind of solvent or treating agent from that at 30 and 140.

Figs. XI, XII, and XIII are diagrammatic general views similar to Figs. I and X, but showing still other forms of apparatus. These forms all present a common difference from Figs. I and X: i. e., the functions of preventing overflow and loss of vapor and of supplying purified treating solvent are separated, instead of being combined as in the form already described. In addition, both the heating of the solvent and the purifying—condensation are preferably performed outside the treating tunnel or apparatus proper and its treating space 30a, and the liquid sealing is omitted. Other simplifications and variations will appear from the drawings, and from the description hereinafter.

Fig. XI shows an apparatus or system wherein the things treated pass successively through separate solvent sprays 31a and 131a—one very hot and the other either hot or cold—in a common chamber or spraying space 30a. From the chamber 30a, the mingled solvent of both sprays drains back through a connection 41a with a trap 142a into a separate thermoinsulated tank 32a, where it is heated (and vaporized) by electric heating means 34a. From the vapor space in the top of the tank 32a, there is a vapor connection 33a to the top of a separate tank 132a; this connection 33a is partly thermoinsulated, and partly provided with condensing means such as a water jacket 46a. The tank 132a is also provided with condensing means, such as a water jacket 47a. Thus the vapor from the tank 32a is condensed in the connection 33a and in the tank 132a, supplying the latter with purified solvent. The tank 132a also has a vent 52a extending to vapor-sealing height above the top of the chamber 30a; which vent 52a may be provided with condensing means such as a water-jacket 152a, to prevent the tank 132a from becoming air bound. Pumps 35 and 135a serve to circulate the solvent from the tanks 32a and 132a to the sprays 31a and 131a. The entrance and exit passages 21 and 22 have condensing means such as water jackets 21a and 22a that prevent escape of solvent vapor, and there is also a drying zone 42a heated by an oven 44a to dry off things treated in the apparatus on their way to the exit. The tanks 32a and 132a are shown provided with valved drain connections 110a, as likewise the trap 142a.

Fig. XII shows an apparatus similar to that of Fig. XI, but having the tank 132a arranged above the spray chamber 30a, and without any condenser on the vapor connection 33a, which is thermoinsulated throughout. This allows the pure spray 131a to be fed by gravity from the tank 132a, and the pump 135a to be omitted, if preferred.

Fig. XIII shows an apparatus like that of Fig. XII, but omitting the first spray device 31a and its accessories, so that the interconnected tanks 32a and 132a together merely act as a still for supplying the spray 131a with purified solvent,—which may be hot, warm, or cold. Such an apparatus is especially advantageous for small things not very dirty nor especially difficult to clean, so that a single spraying suffices. Here, again, the pump 135a may be omitted, if desired.

It will be understood that in all of the forms of apparatus shown in Figs. XI, XII, and XIII, the solvent supply can be purified in the apparatus itself—just as in the apparatus of Figs. I–VII,—by stopping the spray circulations, distilling all or nearly all the solvent into the pure solvent tank 132 or 132a, and then cleaning the residue of dirt and grease out of the vaporizing tank 32 or 32a. The like can be done as between the tanks 31 and 40 in Fig. X.

In Figs. X–XIII, various parts and features are marked with the same reference character as in Figs. I–VII, as a means of dispensing with repetitive description.

Having thus described my invention, I claim:

1. Apparatus of the character described, for treating things or work therein with volatile solvent whose vapor is heavier than air, comprising in combination a treating vessel or enclosure excluding air and retaining the solvent vapor, but open for the introduction and removal of the work treated therein, said vessel or enclosure being provided with a receptacle for liquid solvent and with means also included in the enclosure but independent of said receptacle, for collecting liquid solvent condensate and treating the work therewith; spraying means over said receptacle for spraying the work, and means for supplying said spraying means with liquid solvent from said receptacle; and means for condensing in the enclosure the solvent vapor evolving therein and thereby supplying said collecting and treating means with purified liquid solvent condensate.

2. Apparatus of the character described, for treating things or work therein with volatile solvent whose vapor is heavier than air, comprising in combination a treating vessel or enclosure excluding air and retaining the solvent vapor, but open for the introduction and removal of work, said enclosure including separate liquid solvent retaining receptacles; means for passing the work through said enclosure, over the liquid solvent in one of said receptacles and through that in the other; means for heating in the first mentioned receptacle the liquid solvent therein that is overpassed by the work; means for spraying the passing work with liquid solvent thus heated in said first-mentioned receptacle; and means for condensing the solvent vapor in the enclosure and replenishing the receptacles with the condensate.

3. Apparatus of the character described, for treating things or work therein with volatile solvent whose vapor is heavier than air, comprising in combination a treating vessel or enclosure excluding air and retaining the solvent vapor, but open for the introduction and removal of work, and including separate liquid solvent retaining receptacles, one overflowing into the other; means for passing the work through said enclosure, over the liquid solvent in one of said receptacles and through that in the other; means for spraying the passing work with liquid solvent from the receptacle thus over-passed by the work; and means for condensing in the enclosure the solvent vapor evolving therein and replenshing the overflowing receptacle with the condensate.

4. Apparatus of the character described, for treating things or work therein with volatile solvent whose vapor is heavier than air, comprising in combination a treating vessel or enclosure excluding air and retaining the solvent vapor, but open for the introduction and removal of work, and including therein spraying space with means for collecting the sprayed liquid, a receptacle retaining a pool of liquid solvent separated from said spraying space and thus protected from access of sprayed liquid, but overflowing into the spraying space, and condensing space draining into said pool; means for passing the work through the enclosure and its said spraying space and pool, via said inlet and outlet; means for spraying the passing work in the spraying space with liquid solvent from said collecting means; and means for condensing the solvent vapor evolved in the apparatus in the condensing space, and thus replenishing said pool and the supply of solvent for spraying.

5. Apparatus of the character described, for treating things or work therein with volatile liquid solvent whose vapor is heavier than air, comprising in combination a treating vessel or enclosure excluding air and retaining the solvent vapor, but open for the introduction and removal of work, and including therein an open liquid solvent retaining and heating receptacle; means for heating liquid solvent in said receptacle; means for condensing the vapor thus evolved in the enclosure; another open receptacle included in the enclosure and receiving the condensate from said condenser; a reservoir for temporarily receiving and storing liquid solvent from said latter receptacle and preventing overflow therefrom when the amount of condensate received by said latter receptacle exceeds its capacity, thus allowing all the solvent to be distilled out of said heating receptacle for cleaning; and means for returning liquid solvent from said reservoir to said heating receptacle.

6. Apparatus of the character described, for treating things or work therein with volatile solvent whose vapor is heavier than air, comprising in combination a treating vessel or enclosure excluding air and retaining the solvent vapor, but open for the introduction and removal of work, and including therein an open liquid solvent retaining and heating receptacle; means for heating liquid solvent in said receptacle; means for condensing the vapor thus evolved in the enclosure; another open receptacle included in the enclosure and receiving the condensate from said condenser; a reservoir for temporarily receiving and storing liquid solvent from said latter receptacle and preventing overflow therefrom when the amount of condensate received thereby exceeds its capacity, thus allowing all the solvent to be distilled out of said heating receptacle for cleaning; and means for returning liquid solvent from said latter receptacle and from said reservoir to said heating receptacle.

7. Apparatus of the character described, for treating things or work therein with volatile solvent whose vapor is heavier than air, comprising in combination a treating vessel or enclosure excluding air and retaining the solvent vapor, but open for the introduction and removal of work, said inclosure also having a liquid solvent retaining and heating receptacle at a low point thereof; means for passing the work through the enclosure, via said inlet and outlet, past said receptacle; means for heating and vaporizing liquid solvent in said receptacle; means for spraying the passing work with hot liquid solvent from said receptacle; and means for condensing the solvent vapor liberated in the enclosure, and thereby replenishing the supply of liquid solvent in said receptacle.

8. Apparatus of the character described, for treating things or work therein with volatile liquid solvent whose vapor is heavier than air, comprising a treating vessel or enclosure excluding air and retaining the solvent vapor, but open at a level above its highest interior point for the introduction and removal of work and provided at an intermediate point therewithin with a trap forming part of the passage through the enclosure between the work inlet and outlet and containing and retaining therein a pool of liquid solvent sealing the passage between inlet and outlet against drafts of air or vapor, while permitting passage of work through the pool seal; and means for condensing in the enclosure the solvent vapor evolved from the liquid solvent used therein, and thereby preventing overflow of vapor from the open enclosure and replenishing the pool seal with liquid solvent.

9. Apparatus of the character described, for treating things or work therein with volatile liquid solvent whose vapor is heavier than air, comprising in combination a treating vessel or enclosure excluding air and retaining the solvent vapor, but having and open through inlet and outlet openings for the introduction and removal of work, and intermediately provided with a trap forming part of the passage between said inlet and outlet and containing and retaining therein a pool of liquid solvent sealing the passage between said inlet and outlet against drafts of air or vapor, while permitting passage of work through the pool seal; means for spraying the work with liquid solvent in the enclosure at one side of the pool seal; and means at the spray side of the pool seal for condensing in the enclosure the solvent vapor evolved therein.

10. Apparatus of the character described, for treating things or work therein with volatile solvent whose vapor is heavier than air, comprising a treating vessel or enclosure excluding air and retaining the solvent vapor, but open at a level above its highest interior point for the introduction and removal of work and provided at an intermediate point therewithin with a trap forming part of the passage through the enclosure between the work inlet and outlet and containing and retaining therein a pool of liquid solvent sealing the passage between inlet and outlet against drafts of air or vapor, while permitting passage of work through the pool seal, and also having an overflow from the pool limiting its depth; means for heating and vaporizing liquid solvent in the enclosure, at the same side of the pool seal as said overflow; and means for condensing in the enclosure, at the same side of the pool seal as said overflow, the solvent vapor thus evolved, and thereby preventing overflow of vapor from the enclosure and replenishing the pool seal with liquid solvent.

11. Apparatus of the character described, for treating things or work therein with volatile solvent whose vapor is heavier than air, comprising in combination a treating vessel or enclosure excluding air and retaining the solvent vapor and having inlet and outlet openings for the introduction and removal of work, and intermediately provided with a trap permitting passage of the work but retaining therein a pool of liquid solvent sealing the same against through drafts between said inlet and outlet, and having an overflow for liquid solvent from said pool limiting its depth; a liquid solvent receptacle receiving the overflow from said pool and open into the enclosure; means for heating liquid solvent in said receptacle, thus supplying solvent vapor in the enclosure; and means for condensing this vapor, and thereby replenishing the pool with liquid solvent.

12. Apparatus of the character described, for treating things or work therein with volatile solvent whose vapor is heavier than air, comprising in combination a treating vessel or enclosure excluding air and retaining the solvent vapor, but open for the introduction and removal of work, and including separate liquid solvent retaining receptacles, one overflowing into the other; means for passing the work through said enclosure, through the liquid solvent in the overflowing receptacle and over that in the other receptacle; means for spraying the passing work with liquid solvent from the receptacle thus overpassed by the work; means dipping into the liquid solvent in the overflowing receptacle and thereby preventing through drafts between said inlet and outlet; and means for condensing the solvent vapor in the enclosure and replenishing the receptacles with the condensate.

13. Apparatus of the character described, for treating things or work therein with volatile solvent whose vapor is heavier than air, comprising in combination a treating vessel or enclosure excluding air and retaining the solvent vapor but having and open through inlet and outlet passages extending and opening above the highest interior point of said enclosure, for the introduction and removal of work, and intermediately provided with a trap forming part of the passage between said inlet and outlet, and containing and retaining therein a pool of liquid solvent sealing the passage between said inlet and outlet against drafts of air or vapor, while permitting passage of work through the pool seal; and means for condensing in the apparatus solvent vapor evolved from the liquid solvent used therein and thereby replenishing the pool seal with liquid solvent, besides preventing overflow of vapor from said passages.

14. Apparatus of the character described, for treating things or work therein with volatile solvent whose vapor is heavier than air, comprising in combination a treating vessel or enclosure excluding air and retaining the solvent vapor but having and open through inlet and outlet passages extending and opening above the highest interior point of said enclosure, for the introduction and removal of work, and intermediately provided with a trap forming part of the passage between said inlet and outlet and containing and retaining therein a pool of liquid solvent sealing the passage between said inlet and outlet against drafts of air or vapor, while permitting passage of work through the pool seal; means for condensing in the apparatus solvent vapor evolved from the liquid solvent used therein and thereby replenishing the pool seal with liquid solvent, besides preventing overflow of vapor from said passages; and conveyor means for the work travelling through said enclosure via said inlet and outlet passages, and intermediately through said pool.

15. Apparatus of the character described, for treating things or work therein with volatile solvent whose vapor is heavier than air, comprising in combination a treating vessel or enclosure excluding air and retaining the solvent vapor, but having and open through inlet and outlet passages for the introduction and removal of work extending and opening above the highest interior point of the enclosure, and intermediately provided with a trap permitting passage of the work but retaining therein a pool of liquid solvent sealing said intermediate passage against through drafts between said inlet and outlet; means for spraying the work with the volatile solvent in the enclosure at the inlet side of the pool seal; means in the enclosure at the spray side of the pool seal for condensing the solvent vapor evolved in the enclosure; means for heating the work in the exit passage on its upward way from the pool to the exit opening, and thereby vaporizing liquid solvent remaining on the work; and means at the exit side of the pool seal for condensing in the enclosure the solvent vapor evolved by thus heating the work, and thereby preventing it from overflowing at the exit opening.

16. Apparatus of the character described, for treating things or work therein with volatile liquid solvent whose vapor is heavier than air, comprising in combination a treating vessel or enclosure excluding air and retaining the solvent vapor, but having and open through an exit passage for the work extending and opening above the highest interior point of the enclosure; means for heating the work in said exit passage on its upward way to the exit opening, and thereby vaporizing liquid solvent remaining on the work after treatment therewith in the enclosure; and means for condensing in the enclosure the solvent vapor thus evolved from the work, in such relation to the heating means as to prevent escape of this vapor at said exit opening and recover it as liquid.

17. Apparatus of the character described, for treating things or work therein with volatile liquid solvent whose vapor is heavier than air, comprising in combination a treating vessel or enclosure excluding air and retaining the solvent vapor, but having and open through an exit passage for the work extending upward and open at its upper end; means for heating the work in said exit passage on its upward way to the exit opening, and thereby vaporizing liquid solvent remaining on the work after treatment therewith in the enclosure; and means to the inside of the heating zone, for condensing in the enclosure the solvent vapor evolved by the heating, and thereby preventing it from overflowing at said exit opening and recovering it as liquid.

18. Apparatus of the character described, for treating things or work therein with volatile solvent whose vapor is heavier than air, comprising in combination a treating vessel or enclosure excluding air and retaining the solvent vapor, and including treating space and a passage for work extending above the highest interior point of the enclosure; means for heating and vaporizing the solvent, and for spraying the work with the thus heated solvent in said treating space in the enclosure; a separate condenser receiving the solvent vapor thus evolved; means for also spraying the work with the condensate from said condenser in said treating space; and means for condensing solvent vapor in said passage, and thus preventing it from overflowing from the passage.

19. Apparatus of the character described, for treating things or work therein with volatile solvent whose vapor is heavier than air, comprising in combination a treating vessel or enclosure excluding air and retaining the solvent vapor, and including treating space and a passage for work extending above the treating space of the enclosure; a separate heater receiving used solvent from said treating space of the enclosure; means for returning heated liquid solvent from said heater to said treating space; a separate condenser receiving the solvent vapor from said heater; means for returning the condensate from said separate condenser to said treating space; and means for condensing solvent vapor in said passage, and thus preventing it from overflowing therefrom.

20. Apparatus of the character described, for treating things or work therein with volatile solvent whose vapor is heavier than air, comprising in combination a treating vessel or enclosure excluding air and retaining the solvent vapor, and including treating space and a passage for work extending above the highest interior point of the enclosure; a separate heater receiving used solvent from said treating space of the enclosure; means for spraying the work with the thus heated solvent in said treating space; a separate condenser receiving the solvent vapor from said heater; means for also spraying the work with the condensate from said condenser in said treating space; and means for condensing solvent vapor in said passage, and thus preventing it from overflowing from the passage.

CLARENCE F. DINLEY.